A. D. Fisk,
Coffin.
No. 919. Reissued Mar. 6, 1860.
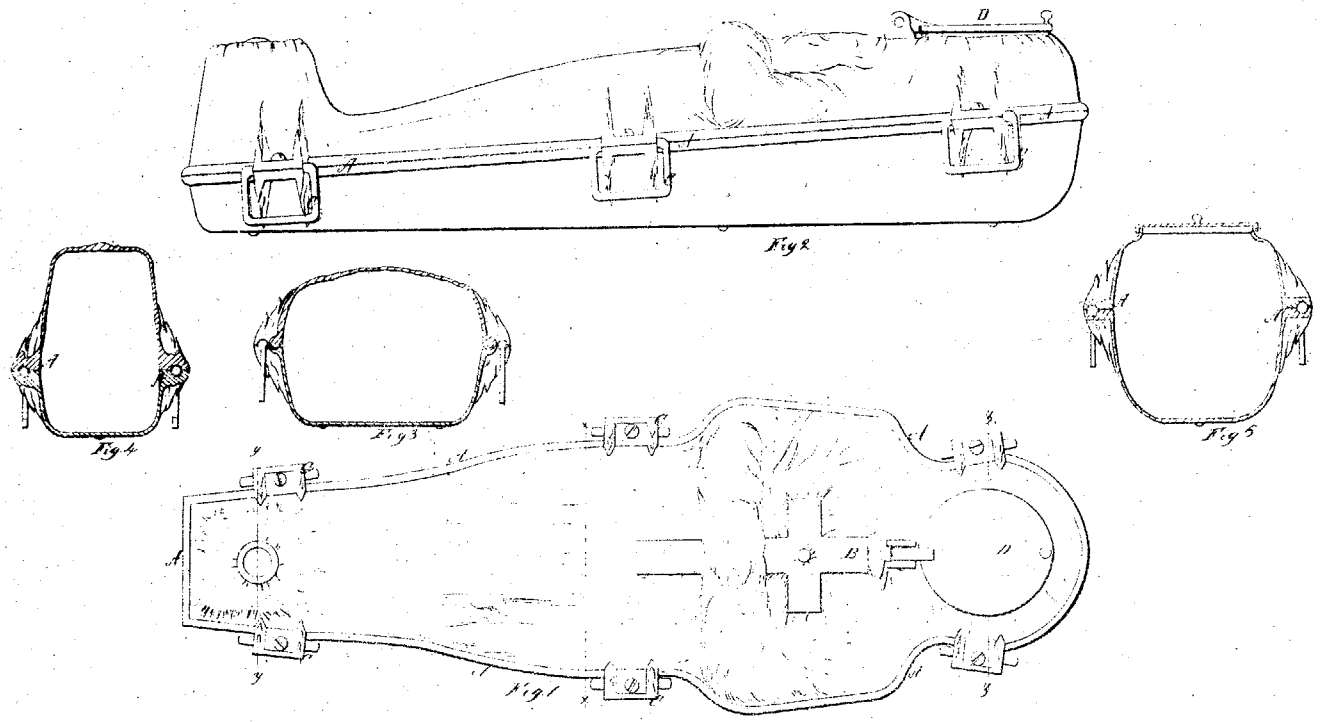

UNITED STATES PATENT OFFICE.

JOHN G. FORBES AND ROBERT SQUIERS, OF NEW YORK, N. Y., ASSIGNEES, BY MESNE ASSIGNMENTS, OF A. D. FISK.

IMPROVEMENT IN COFFINS.

Specification forming part of Letters Patent No. 5,920, dated November 14, 1848; Reissue No. 919, dated March 6, 1860.

*To all whom it may concern:*

Be it known that ALMOND D. FISK, of the city, county, and State of New York, did invent a new and useful manner of constructing air-tight coffins of cast or raised metal, of which the following is a full and exact description.

Metallic coffins have heretofore been made of shapes corresponding to those which are usually constructed of wood; but from their great weight, the difficulty of rendering them air-tight, and other objections, they have not been generally used. To obviate these objections as far as practicable is the purpose of the present invention.

To dispense with all unnecessary weight of metal, the form of the coffin is made to conform as nearly as practicable to that of the human body. This is more fully accomplished by constructing it of two shells, an upper and a lower, which are joined together in a horizontal line, in the manner hereinafter described. These two shells are best made of nearly the same depth; so that the line of their junction shall be at or near the middle point in the height of the coffin; but this may be varied to suit the taste or other purpose of the manufacturer, but no great difference can be made in the relative depth of those shells without adding materially to the weight of the coffin. The two shells are more or less curvilinear in nearly all their parts, and they may be made as thin as the running of the metal will admit, which will secure to them more than sufficient strength to resist any pressure to which they may be subjected.

In the accompanying drawings, Figure 1 is a top view, and Fig. 2 a side elevation, of this metallic coffin. Fig. 3 is a cross section thereof in the line *x x* of Fig. 1. Fig. 4 is a cross-section in the line *y y*, and Fig. 5 a cross-section in the line *z z*. These sectional views show the curvilinear form of the two shells. The letters A A show the line of their junction, each being furnished with a flange or projecting arm for the reception of screws or rivets, the junction being made tight by means of the well-known iron-cement or other equivalent means.

In the drawings, a cross, B, is represented on the breast of the coffin, and handles *c c* are also shown of a particular form; but these are unimportant to the present purpose, and they may be varied at pleasure.

It has been the practice heretofore in some instances to place a round plate of glass, cemented air-tight, over the face of the corpse in cast metal or composition coffins. A metallic plate covering such a plate of glass is shown at D.

From a coffin of this description the air may be exhausted so completely as to entirely prevent the decay of the body contained therein; or, if preferred, the coffin may be filled with gas or fluid having the property of preventing putrefaction.

We do not claim the making of coffins from cast or raised metal in two parts when the one is so constructed as to contain entire the body of the corpse, while the other is a mere lid or cover for the same; but What we do claim as new, and desire to secure by Letters Patent, is—

1. The manufacturing of coffins of cast or raised metal, when made substantially in the form and manner above described—that is to say, corresponding nearly with the human form, and making the coffin in two parts or shells united by a flange, substantially as above set forth.

2. The manufacture of coffins of raised or cast metal in two shells, each formed with recesses of greater or less depth, which shall respectively constitute a portion of the receptacle of the corpse, thus approximating the coffin more nearly in shape to that of the human body than could otherwise be done.

J. G. FORBES.
R. SQUIERS.

Witnesses:
W. H. FORBES,
J. B. NONES.